US012730559B2

(12) United States Patent
Ritchie et al.

(10) Patent No.: US 12,730,559 B2
(45) Date of Patent: Sep. 8, 2026

(54) SHARED MEMORY WITH PRIORITY-BASED NOTIFICATIONS

(71) Applicant: Arista Networks, Inc., Santa Clara, CA (US)

(72) Inventors: Duncan Stuart Ritchie, Bowen Island (CA); Christopher Elisha Neilson, Coquitlam (CA); Sebastian Sapa, Vancouver (CA); Waris Boonyasiriwat, Burnaby (CA)

(73) Assignee: ARISTA NETWORKS, INC., Santa Clara, CA (US)

( * ) Notice: Subject to any disclaimer, the term of this patent is extended or adjusted under 35 U.S.C. 154(b) by 436 days.

(21) Appl. No.: 18/458,933

(22) Filed: Aug. 30, 2023

(65) Prior Publication Data

US 2025/0077073 A1 Mar. 6, 2025

(51) Int. Cl.
*G06F 9/54* (2006.01)
*G06F 3/06* (2006.01)

(52) U.S. Cl.
CPC .......... *G06F 3/0605* (2013.01); *G06F 3/0659* (2013.01); *G06F 3/067* (2013.01); *G06F 9/544* (2013.01); *G06F 9/546* (2013.01)

(58) Field of Classification Search
CPC ...... G06F 3/0605; G06F 3/0659; G06F 3/067; G06F 9/544; G06F 9/546
See application file for complete search history.

(56) References Cited

U.S. PATENT DOCUMENTS

| | | | | |
|---|---|---|---|---|
| 6,014,730 | A | 1/2000 | Ohtsu | |
| 7,120,113 | B1 * | 10/2006 | Zhang | H04L 47/2416 370/412 |
| 7,516,196 | B1 | 4/2009 | Madan et al. | |
| 8,099,538 | B2 | 1/2012 | Saha et al. | |
| 8,838,539 | B1 | 9/2014 | Ashcraft et al. | |
| 9,367,251 | B2 | 6/2016 | Holbrook et al. | |

(Continued)

OTHER PUBLICATIONS

Sullivan, Mark, et al. "Using Write Protected Data Structures To Improve Software Fault Tolerance in Highly Available Database Management Systems", Proceedings of the 17th International Conference on Large Data Bases, Sep. 1, 1991, pp. 171-180, XP055141954, http://www.vlcb.org/conf/1991/P171.PDF, Barcelona, Spain.

(Continued)

*Primary Examiner* — Sisley N Kim
(74) *Attorney, Agent, or Firm* — Fountainhead Law Group, PC

(57) ABSTRACT

Notifications for data written to a shared memory are prioritized so that certain data can be processed ahead of other data. A writer stores all notifications to a main notification queue store, including normal priority notifications and different levels of high priority notifications. A set of priority notification queues store pointers to entries in the main notification queue that contain high priority notifications. The writer stores notifications to the main notification queue of a given high priority level to a corresponding priority notification queue. Readers read notifications and process the data pointed to in the notifications. A reader first reads the priority notification queues to consume high priority notifications followed by consuming normal priority notifications.

20 Claims, 7 Drawing Sheets

(56) References Cited

U.S. PATENT DOCUMENTS 9,495,114 B2 11/2016 Holbrook et al.
9,576,038 B1 2/2017 Huang et al.
2002/0087500 A1 7/2002 Berkowitz et al.
2003/0126265 A1 7/2003 Aziz et al.
2005/0041587 A1* 2/2005 Lee ..................... H04L 45/00 370/359
2007/0067349 A1 3/2007 Jhaveri et al.
2007/0133531 A1* 6/2007 Kodama ............ H04L 47/2441 370/432
2007/0233710 A1 10/2007 Passey et al.
2008/0126741 A1 5/2008 Triplett
2010/0114915 A1 5/2010 Gorton, Jr.
2011/0283082 A1 11/2011 Mckenney et al.
2012/0079212 A1 3/2012 Dantzig et al.
2014/0025898 A1 1/2014 Iyengar
2014/0064297 A1* 3/2014 Hirota .................. H04J 3/0667 370/412
2014/0079064 A1 3/2014 Angst et al.
2014/0337593 A1 11/2014 Holbrook et al.
2014/0359232 A1 12/2014 Holbrook et al.
2015/0154220 A1 6/2015 Ngo et al.
2016/0098432 A1 4/2016 Madany et al.
2016/0117254 A1 4/2016 Susarla et al.
2016/0191509 A1 6/2016 Bestler et al.
2016/0253098 A1 9/2016 Holbrook et al.
2017/0068700 A1 3/2017 Sapa et al.
2021/0382863 A1* 12/2021 Munipalle .......... G06F 16/2246
2023/0079452 A1* 3/2023 Lafferty ................ H04L 65/65 725/116
2023/0198771 A1* 6/2023 Ho ....................... H04L 43/065 713/168

OTHER PUBLICATIONS

Extended European Search Report for Counterpart European Patent Application No. 14167803.7, dated Oct. 7, 2014.

* cited by examiner main notification queue, 202
H2
H1
N
N
H3
H3
H1
N
H3
H2
N
--
(metadata)
time tracker, 208
0
1
2
3
4
5
22
23
24
25
26
27
priority notification queue (H1), 204-a
1
22
(metadata)
time tracker, 210-a
priority notification queue (H2), 204-b
0
25
(metadata)
210-b
priority notification queue (H3), 204-c
4
5
24
(metadata)
210-c
notification, 206
signal from writer
readers, 216
agents, 218
data, 200
shared memory, 214

SHARED MEMORY WITH PRIORITY-BASED NOTIFICATIONS

CROSS REFERENCE TO RELATED APPLICATIONS

This application is related to U.S. Pat. No. 9,367,251 issued Jun. 14, 2016 and U.S. Pat. No. 9,996,263 issued Jun. 12, 2018, the content of both of which are incorporated herein by reference in their entirety for all purposes.

BACKGROUND

A network device can include two different planes that are used to process network traffic, a control plane and a data plane. The data plane receives, processes, and forwards network traffic using various data tables. For example, for each received packet, the data plane determines a destination address of that packet, looks up the requisite information for that destination in one or more tables stored in the data plane, and forwards the packet on the proper outgoing interface. The control plane gathers configuration data from different sources (e.g., locally stored configuration data (e.g., from a user via a command line interface (CLI), from a management channel using Simple Network Management Protocol (SNMP), and the like) and configures the data plane using the configuration data.

The control plane can store the configuration data in one or more tables. For example, the network device can store routing information in a routing table that is used by the data plane. The data plane can include multiple different hardware forwarding engines. Each of these hardware forwarding engines can use the configuration data from these tables by reading the tables in the control plane and updating respective local copies of the tables for each of the hardware forwarding engines.

The control plane can include a writer that writes the configuration data, and multiple readers for the hardware forwarding engines to read this data. A race condition can arise when one of the readers attempts to read data from one of the tables that is being written by the writer. For example, if a reader reads a table entry that is concurrently being modified by the writer, the reader may read data that is partially updated and, thus, is not valid data that is usable by the reader. A notification mechanism can be used to coordinate between the writer writing the data and multiple readers reading the data. The present disclosure describes one such notification mechanism.

BRIEF DESCRIPTION OF THE DRAWINGS

With respect to the discussion to follow and in particular to the drawings, it is stressed that the particulars shown represent examples for purposes of illustrative discussion, and are presented in the cause of providing a description of principles and conceptual aspects of the present disclosure. In this regard, no attempt is made to show implementation details beyond what is needed for a fundamental understanding of the present disclosure. The discussion to follow, in conjunction with the drawings, makes apparent to those of skill in the art how embodiments in accordance with the present disclosure may be practiced. Similar or same reference numbers may be used to identify or otherwise refer to similar or same elements in the various drawings and supporting descriptions. In the accompanying drawings.

DETAILED DESCRIPTION

Figure 1:
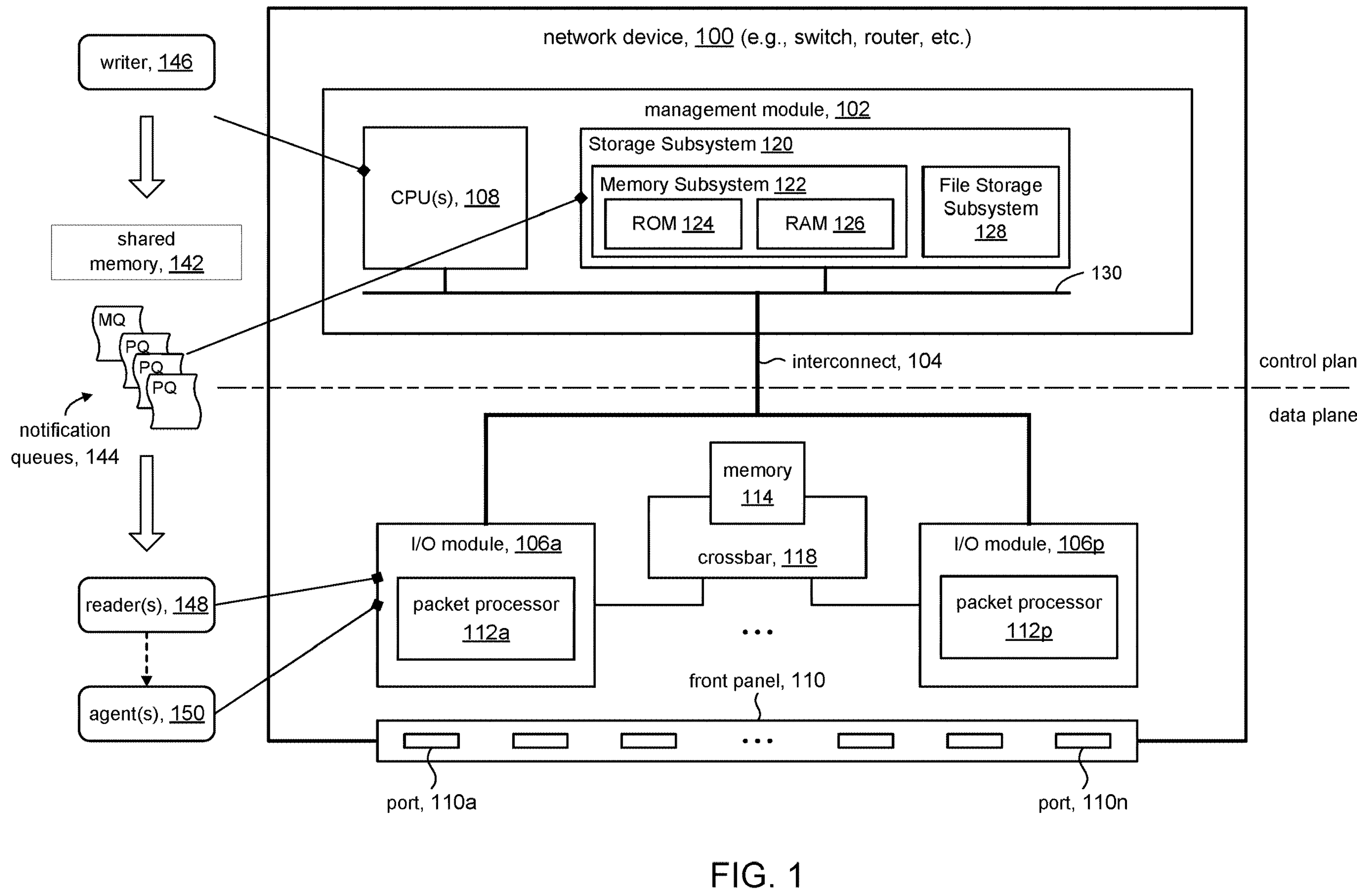
FIG. 1 shows a network device adapted in accordance with the present disclosure.

We disclose a mechanism for stateful sharing of data via a shared memory between a single writer (producer) and multiple readers (consumers) on a CPU. The mechanism allows readers to support asynchronous, distributed, cooperating agents. Agents can be structured as state machines, and state changes can be triggered by respective readers when the readers receive notifications that data has been written to the shared memory by the writer. The shared memory can serve as a central clearinghouse of state, responsible for storage and delivery of state to the readers and corresponding agents. This notification model is a useful mechanism for distributed software development.

The notification model disclosed herein has broad application in the shared state space. To provide some context for describing the state-sharing mechanism of the present disclosure, embodiments will be explained in terms of IP (Internet Protocol) routes, where a writer notifies readers of new IP routes to be programmed by suitable agents and readers to program the IP routes. In various embodiments, the writer notifies readers of new IP routes in order to trigger corresponding agents to program those IP routes. Sometimes it may be desirable to designate certain routes as having higher priority than normal routes, where the higher priority routes are programmed to hardware earlier than the normal routes (referred to herein as normal priority routes). This can be significant at the scale of millions of routes and churn, where customers want a small number of high priority routes to converge faster than the millions of normal priority routes.

In accordance with the present disclosure, the writer can write notifications to a notification queueing mechanism, and readers read out the notifications from the notification queueing mechanism. The notifications inform the reader of new IP routes (e.g., stored in shared memory) to be programmed and in accordance with the present disclosure carry priority information to allow some routes to be programmed before other routes. The notification queueing mechanism can be organized into a set of notification queues comprising a main notification queue and one or more priority notification queues. As the name suggests, the priority notification queues can represent notifications for high priority IP routes. In some embodiments, several priority levels are recognized where IP routes of having different priority levels can be recognized. The data (e.g., IP routes) to be notified can be stored in the shared memory. Notifications in the main notification queue point to or otherwise reference the shared memory. In some embodiments, for example, pointers to notifications in the main notification queue can be stored in priority notification queues that correspond to the priority levels of the notifications (i.e., the IP routes represented in the notifications). High priority routes can be accessed by accessing the corresponding priority notification queues. In some embodiments, the normal priority routes can be accessed directly from the main notification queue because higher priority routes will have been processed in the corresponding priority notification queues.

The present disclosure classifies routes and queues according to priority. Using "priority" is a way to classify routes and queues in the context of programming routes. However, it will be appreciated by those of ordinary skill that routes and notification queues need not be classified according to different priorities. In other contexts, routes and notification queues can be tagged according to any tagging system. Merely to illustrate the point, in some embodiments, routes and notification queues can be tagged according to a color scheme where, for example, routes tagged a belonging to a "blue" virtual routing and forwarding (VRF) instance can be stored in a blue queue, routes belonging to a "red" VRF can be stored in a "red" queue, routes in a "green" VRF can be stored in a "green" queue, and so on. The reader can decide to process notifications in some order, such as a round-robin, e.g. process one red, then one blue, then one green.

In the following description, for purposes of explanation, numerous examples and specific details are set forth in order to provide a thorough understanding of embodiments of the present disclosure. Particular embodiments as expressed in the claims may include some or all of the features in these examples, alone or in combination with other features described below, and may further include modifications and equivalents of the features and concepts described herein.

FIG. 1 is a schematic representation of a network device 100 (e.g., a router, switch, firewall, and the like) that can be adapted in accordance with the present disclosure. In some embodiments, for example, network device 100 can include a management module 102, one or more I/O modules (switches) 106*a*-106*p*, and a front panel 110 of I/O ports (physical interfaces, I/Fs) 110*a*-110*n*. Management module 102 can constitute the control plane of network device 100 (also referred to as the control layer or simply the CPU), and can include one or more management CPUs 108 for managing and controlling operation of network device 100 in accordance with the present disclosure. Each management CPU 108 can be a general-purpose processor, such as an Intel®/AMD® x86, ARM® microprocessor and the like, that operates under the control of software stored in a memory device/chips such as ROM (read-only memory) 124 or RAM (random-access memory) 126. The control plane provides services that include traffic management functions such as routing, security, load balancing, analysis, and the like.

The one or more management CPUs 108 can communicate with storage subsystem 120 via bus subsystem 130. Other subsystems, such as a network interface subsystem (not shown in FIG. 1), may be on bus subsystem 130. Storage subsystem 120 can include memory subsystem 122 and file/disk storage subsystem 128. Memory subsystem 122 and file/disk storage subsystem 128 represent examples of non-transitory computer-readable storage devices that can store program code and/or data, which when executed by one or more management CPUs 108, can cause one or more management CPUs 108 to perform operations in accordance with embodiments of the present disclosure.

Memory subsystem 122 can include a number of memories such as main RAM 126 (e.g., static RAM, dynamic RAM, etc.) for storage of instructions and data during program execution, and ROM (read-only memory) 124 on which fixed instructions and data can be stored. File storage subsystem 128 can provide persistent (i.e., non-volatile) storage for program and data files, and can include storage technologies such as solid-state drives and/or other types of storage media known in the art.

Management CPUs 108 can run a network operating system stored in storage subsystem 120. A network operating system is a specialized operating system for network device 100. For example, the network operating system can be the Arista EOS® operating system, which is a fully programmable and highly modular, Linux-based network operating system developed and sold/licensed by Arista Networks, Inc. of Santa Clara, California. It is understood that other network operating systems may be used.

Bus subsystem 130 can provide a mechanism for the various components and subsystems of management module 102 to communicate with each other as intended. Although bus subsystem 130 is shown schematically as a single bus, alternative embodiments of the bus subsystem can utilize multiple buses.

The one or more I/O modules 106*a*-106*p* can be collectively referred to as the data plane of network device 100 (also referred to as data layer, forwarding plane, etc.). Interconnect 104 represents interconnections between modules in the control plane and modules in the data plane. Interconnect 104 can be a PCIe (Peripheral Component Interconnect Express) bus or any other suitable bus architecture (e.g., SMBus (System Management Bus), I2C (Inter-Integrated Circuit), etc.).

I/O modules 106*a*-106*p* can include respective packet processing hardware comprising packet processors 112*a*-112*p* to provide packet processing and forwarding capability. Each I/O module 106*a*-106*p* can be further configured to communicate over one or more ports 110*a*-110*n* on the front panel 110 to receive and forward network traffic. Packet processors 112*a*-112*p* can comprise hardware (circuitry), including for example, data processing hardware such as an ASIC (application specific integrated circuit), FPGA (field programmable array), processing unit, and the like. Packet processors 112*a*-112*p* can include forwarding lookup hardware such as, for example, but not limited to content addressable memory such as TCAMs (ternary CAMs) and auxiliary memory such as SRAMs (static RAM).

Memory hardware 114 can include the buffers used for queueing packets. I/O modules 106*a*-106*p* can access memory hardware 114 via crossbar 118. It is noted that in other embodiments, the memory hardware 114 can be incorporated into each I/O module. The forwarding hardware in conjunction with the lookup hardware can provide wire speed decisions on how to process ingress packets and outgoing packets for egress. In accordance with some embodiments, some aspects of the present disclosure can be performed wholly within the data plane.

Processes running in the control plane can gather configuration data (e.g., forwarding, security, quality of service (QOS), and other network traffic processing information) from different sources. A writer (producer) 146 running on CPU 108 can store this configuration data into various data tables in shared memory 142, including adding, deleting, or otherwise modifying data stored in the data tables. The writer 146 can notify readers (consumers) 148 in the data plane (e.g., running in the I/O modules 106) that there is new data in the shared memory. In accordance with the present disclosure, the writer 146 can notify readers 148 using notification queues 144 comprising a main notification queue and one or more priority notification queues. In some embodiments, the readers 148 can take action in accordance with the notifications. In other embodiments, the readers 148 can signal respective agents 150 to take action in accordance with the notifications.

Persons of ordinary skill will understand that the notifications can comprise any kind of information that is shared by multiple consumers. However, as noted above for discussion purposes, aspects of the present disclosure will be explained in the context of IP routes, where writer 146 writes notifications to queues 144 that represent new IP routes to be programmed. Readers 148 can read the notifications to trigger corresponding agents 150 to perform appropriate actions such as programming the IP routes. Additional detail of these aspects of the present disclosure will now be described.

Figure 2A:
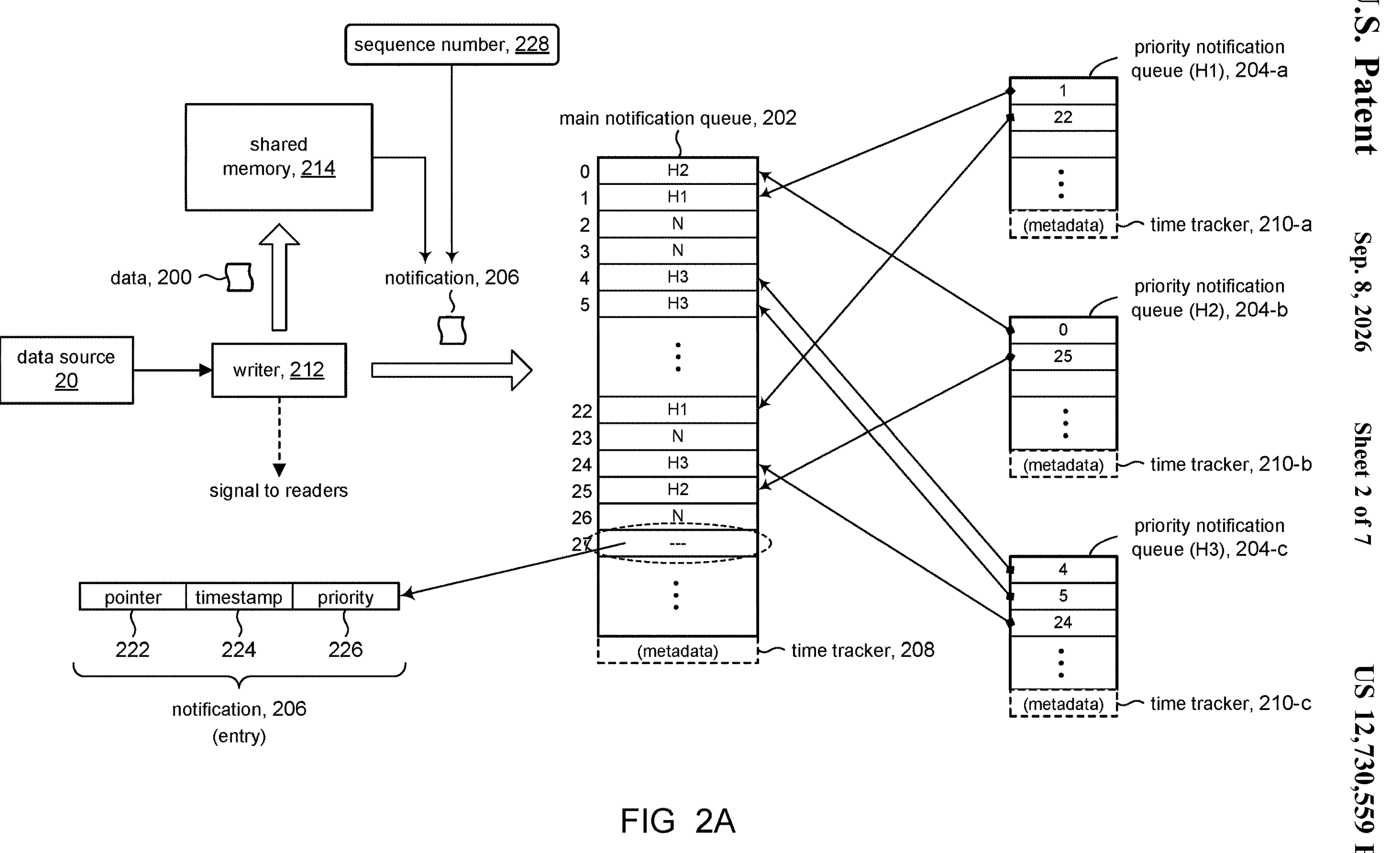
FIGS. 2A and 2B represent a notification mechanism in accordance with the present disclosure.
Figure 2B:
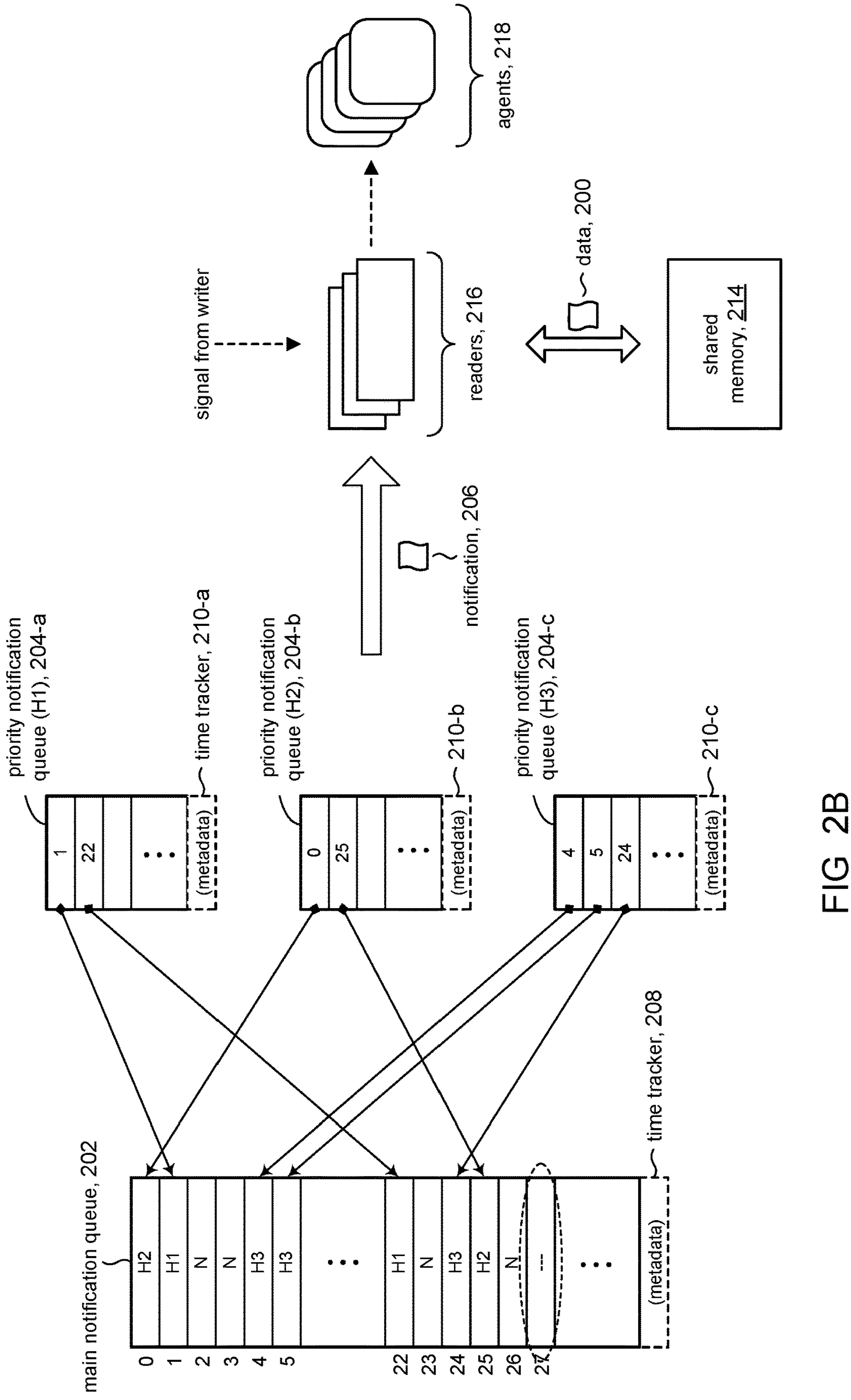

FIGS. 2A and 2B show a representation of the data structures for a notification queue mechanism comprising notification queues 202, 204 in accordance with the present disclosure. A data source 20 can write data 200 (e.g., IP route directives) to a shared memory 214 via writer 212. The notification queues provide a mechanism for the writer 212 to notify/inform readers 216 of new/updated data in the shared memory 214. The writer 212 can signal or otherwise trigger the readers 216 when a notification 206 is inserted into the notification queue mechanism.

In some embodiments, the notification queue mechanism can include a main notification queue 202 and one or more priority notification queues (collectively identified by the reference numeral 204) to access content stored in shared memory 214. In some embodiments, the main notification queue 202 can comprise notifications/entries 206, where each notification 206 comprises a pointer component 222, a timestamp component 224, and a priority level component 226.

The pointer 222 contains information that identifies a location in the shared memory 214 that contains the data 200. In some embodiments, the location information can be a memory address (e.g., a pointer) to a block of memory in the shared memory. In other embodiments, shared memory can include a table of slots that contain data 200, where the location information is a slot identifier of the slot that contains the data.

The timestamp 224 represents when data 200 was written to the shared memory. In some embodiments, a global sequence number 228 can serve as the timestamp. As will be discussed in more detail below, the global sequence number can be incremented with each new notification 206.

The priority 226 represents a priority associated with data 200. Normally, all data have equal priority, meaning they can be processed simply on a first-in first-out basis. Some data may need to be processed ahead of other data; such data can be referred to as high priority data while all other data can be referred to as "normal" priority data. In some embodiments, the priority can be a numeric value; e.g., '0' is normal priority level, priority level '1' is higher priority than priority level '0', priority level '2' is higher priority than '1', and so on. Because of the numbering convention used herein for assigning priority levels, the normal priority level (priority level '0') can also be referred to herein as the "lowest" priority level.

Notifications for newly added data can be inserted at the end of the queue. For example, in the configuration shown in FIG. 2, the entry indexed by 27 is the next empty entry to receive a notification. In accordance with the present disclosure, notifications can be processed (consumed) in order of priority, and within each priority, can be read in first-in, first-out order.

Each priority notification queue 204 corresponds to notifications of a given priority level. The example shown in FIG. 2 shows four priority levels of notifications: H1 represents the highest priority level, H2 represents the next highest priority level, H3 represents the highest priority level after H2, and N represents normal (lowest) priority notifications. Notifications that are higher priority than normal priority notifications can be referred to generally as high priority notifications. In accordance with some embodiments, entries in priority notification queue 204-*a* (the highest priority notification queue) point to high priority notifications that are designated as H1 priority, entries in priority notification queue 204-*b* (the next highest priority notification queue) point to high priority notifications that are designated as H2 priority, and likewise with priority notification queue 204-*c*. Although not shown in FIG. 2, it will be appreciated that additional priority levels can be defined with corresponding priority notification queues. In some embodiments, the normal priority notifications can be accessed directly from the main notification queue 202, and for this reason the main notification queue may be referred to herein as the normal queue.

Each priority notification queue 204 comprises entries that point to notifications (e.g., using their respective indices) in the main notification queue 202 whose priorities correspond to the priority of the priority notification queue. For example, priority notification queue 204-*a* stores H1 priority notifications which are pointers to the H1 priority notifications in the main notification queue; in the example in FIG. 2, priority notification queue 204-*a* includes entry index 1 and entry index 22. Likewise for priority notification queue 204-*b* and priority notification queue 204-*c*.

Queues 202 and 204 include respective metadata to manage the queues; e.g., queue size, number of notifications, etc. In accordance with some embodiments the metadata can include a time tracker 208 for main notification queue 202 and time tracker 210 for respective priority notification queues 204. The time trackers 208, 210 represent (keep track of) the most recently consumed notifications in their respective queues.

FIG. 2B shows that readers 216 can read notifications 206 from the notification queues 202, 204 in response to being signaled or otherwise triggered by the writer. The readers 216 can use the notifications 206 to access data stored in shared memory 214. The readers can then signal or otherwise trigger corresponding agents 218 to process the data.

Figure 3:
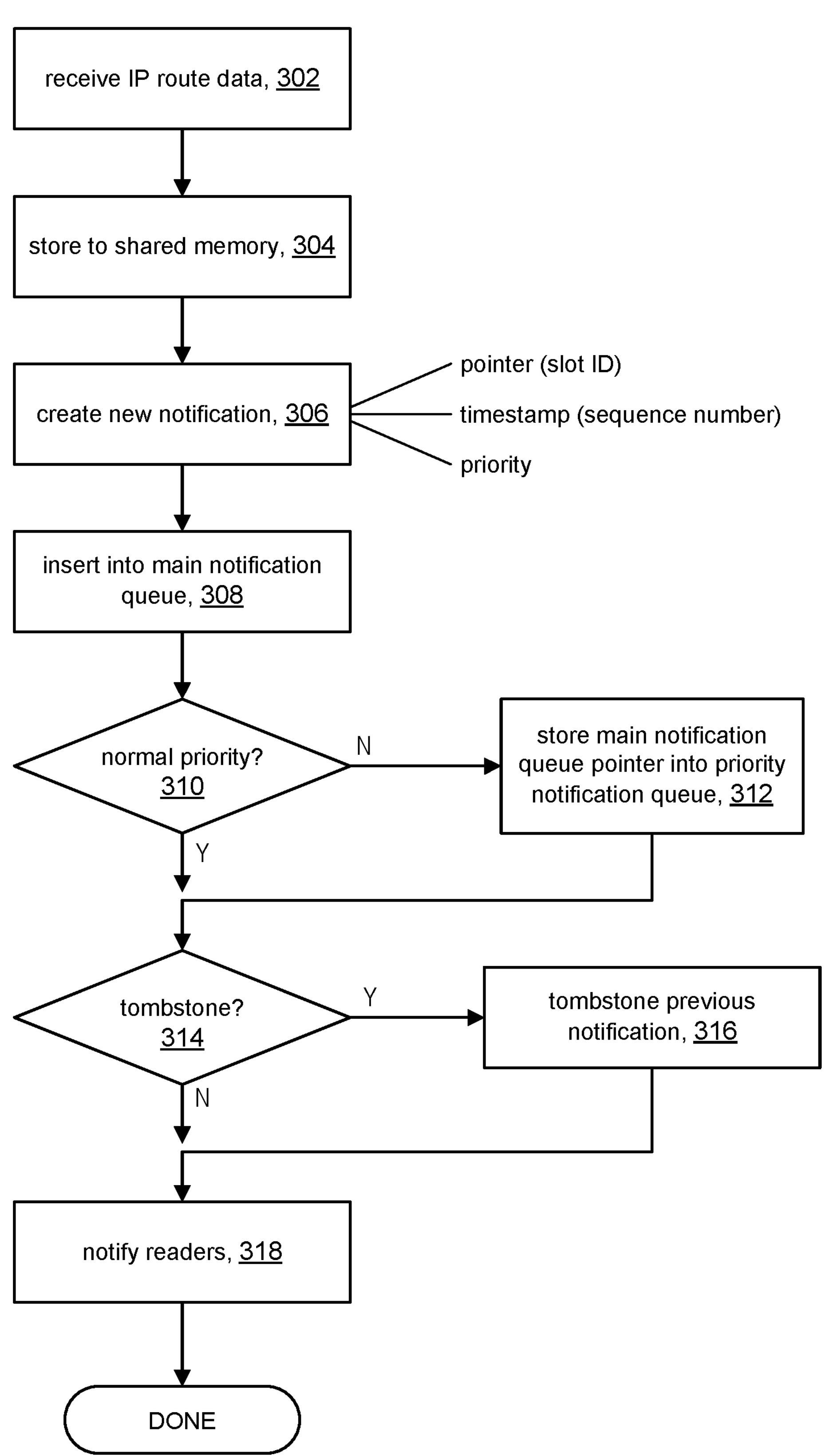
FIG. 3 represents processing by a writer in accordance with the present disclosure.

Referring to FIG. 3, the discussion will now turn to a high-level description of processing in a network device (e.g., writer 212) for writing notifications into the notification queues (e.g., main notification queue 202, priority notification queues 204) in accordance with the present disclosure. Depending on a given implementation, the processing may be performed entirely in the control plane or entirely in the data plane, or the processing may be divided between the control plane and the data plane. In some embodiments, for example, the network device can include one or more processing units (circuits), which when operated, can cause the network device to perform processing in accordance with FIG. 3. Processing units (circuits) in the control plane can include general CPUs that operate by way of executing computer program code stored on a non-volatile computer readable storage medium (e.g., read-only memory); for example, CPU 108 in the control plane (FIG. 1) can be a general CPU. Processing units (circuits) in the data plane can include specialized processors such as digital signal processors, field programmable gate arrays, application specific integrated circuits, and the like, that operate by way of executing computer program code or by way of logic circuits being configured for specific operations. For example, each packet processor 112*a*-112*p* in the data plane (FIG. 1) can be a specialized processor. The operation and processing blocks described below are not necessarily executed in the order shown. Operations can be combined or broken out into smaller operations in various embodiments. Operations can be allocated for execution among one or more concurrently executing processes and/or threads.

At operation 302, a writer running in the control plane of a network device can receive IP route data from a data source. In some embodiments, for example, the IP route can be configuration data entered by a user (data source) via a command line interface to be programmed in the network device (e.g., in a routing table). In accordance with the present disclosure, the IP route data can include or otherwise be associated with a priority level. By default, IP routes can be programmed on a first come, first served basis; i.e., have no, or "normal", priority. Some IP routes, however, may be deemed more important than others. In some instances, for example, it may be desirable to learn internal routes, such as BGP learned routes, ISIS routes, Tunnel routes learned via LDP/RSVP, etc., before learning external routes. A priority level can be associated with such routes in accordance with the present disclosure so that they are programmed before the other routes. Such routes can be deemed to be high priority. In accordance with the present disclosure, the IP route data can include or otherwise be associated with a priority level. For example, a priority level of '1' can be used to designate a high priority route. A priority level of '0' (lowest priority) can be used to designate a normal priority route that is processed in first come, first serve order. In some embodiments, more than two priority levels can be defined, such as High, Medium, Low (normal) priority.

At operation 304, the writer can store the received IP route (data) to a shared memory (e.g., 214). In some embodiments, for example, the shared memory can include a table of slots. The writer can store the received IP route in an available slot in the table.

At operation 306, the writer can create a new notification (e.g., 206) to notify/inform readers (e.g., 216) of the new data in the shared memory to be processed. The notification can include a pointer (e.g., 222) that identifies the slot in shared memory that contains the data. In some embodiments, for example, the pointer can be the index number of the slot in the table. The notification can include the priority level (e.g., 226) associated with the data.

In addition, in accordance with some embodiments, the notification can include a timestamp (e.g., 224) that represents when the IP route was received and hence when the notification was created. In some embodiments, the timestamp can be a sequence number (e.g., 228) that is monotonically incremented with each new notification. The writer can increment the sequence number and store it in the timestamp component of the new notification. As such, the timestamp component in a notification represents a creation time relative to other notifications; e.g., a notification with a timestamp of '10' was created earlier in time than a notification with a timestamp of '21'.

At operation 308, the writer can insert the newly created notification into the next entry in the main notification queue (e.g., 202). For example, the notifications can be stored in the main notification queue in order from earliest-in-time (at the head of the main notification queue) to latest-in-time (at the end of the queue). Because any embodiment of the main notification queue is limited by a finite amount of memory, space can be reclaimed when the end of the queue is reached. This aspect of the present disclosure is discussed below in connection with FIG. 6.

At decision point 310, if the priority level of the received IP route (e.g., stored in the newly created notification) is normal priority, then processing can proceed to decision point 314. If the priority level of the received IP route is higher than normal priority, then processing can proceed to operation 312.

At operation 312, in response to a determination that the received IP route is a higher priority route than normal priority, the writer can insert a reference to the notification in one of the priority notification queues (e.g., 204). As explained above, there is a corresponding priority notification queue for each priority level above normal priority. In accordance with some embodiments, the writer can insert a pointer to the main notification queue that contains the newly created notification into an entry in the priority notification queue that corresponds to the priority level associated with the newly created notification. The pointer can be the index number of the entry in the main notification queue that contains the notification.

At decision point 314, if an earlier notification targets the same slot in shared memory as the newly created notification, then processing can proceed to operation 316; otherwise, process can proceed to operation 318. At operation 316, when an earlier notification targets the same slot in shared memory as the newly created notification, the writer can tombstone (invalidate) the earlier notification because the earlier notification is obsoleted by the newly created notification. In some embodiments, for example, the writer can use the pointer components in the notifications to identify a notification that accesses the same slot. The identified notification can be tombstoned by any suitable means, such as by marking the identified notification as being invalid, clearing (zeroing out) the entry of the notification, and so on. Tombstoning can create "holes" in the main notification queue, which can be reclaimed as described in connection with FIG. 6.

At operation 318, the writer can signal the readers (e.g., 216) that a newly created notification has been inserted in the main notification queue. Any suitable signaling mechanism can be used to signal the readers, the specifics of which depend on the particular signaling mechanism used, capabilities of the operating system, and so on. Processing the received IP route by the writer can be deemed complete.

Figure 4:
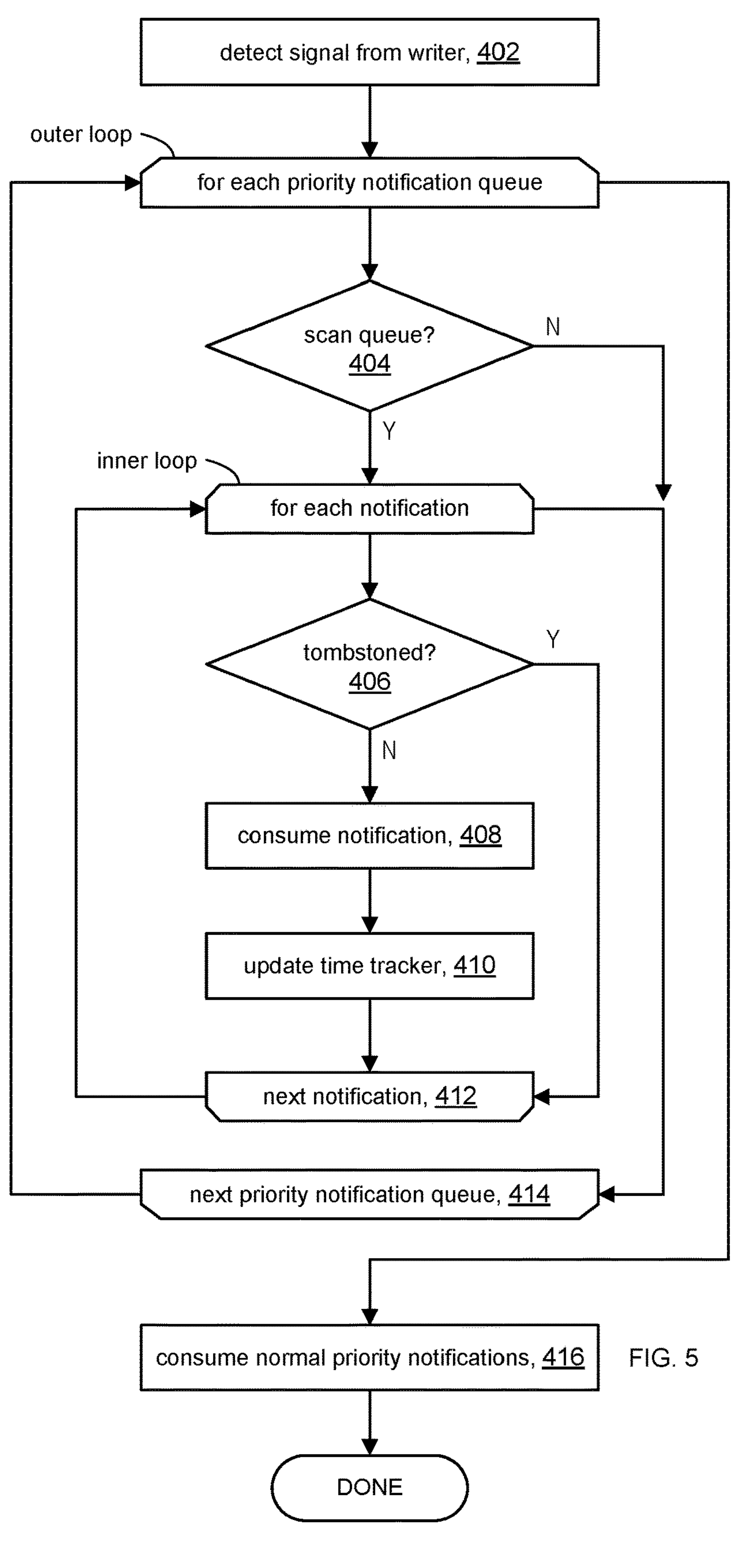
FIGS. 4 and 5 represent processing by a reader in accordance with the present disclosure.

Referring to FIG. 4, the discussion will now turn to a high-level description of processing in a network device (e.g., reader 216) for reading notifications from the notification queues (e.g., main notification queue 202, priority notification queues 204) in accordance with the present disclosure. Depending on a given implementation, the processing may be performed entirely in the control plane or entirely in the data plane, or the processing may be divided between the control plane and the data plane. In some embodiments, for example, the network device can include one or more processing units (circuits), which when operated, can cause the network device to perform processing in accordance with FIG. 4. Processing units (circuits) in the control plane can include general CPUs that operate by way of executing computer program code stored on a non-volatile computer readable storage medium (e.g., read-only memory); for example, CPU 108 in the control plane (FIG. 1) can be a general CPU. Processing units (circuits) in the data plane can include specialized processors such as digital signal processors, field programmable gate arrays, application specific integrated circuits, and the like, that operate by way of executing computer program code or by way of logic circuits being configured for specific operations. For example, each packet processor 112*a*-112*p* in the data plane (FIG. 1) can be a specialized processor. The operation and processing blocks described below are not necessarily executed in the order shown. Operations can be combined or broken out into smaller operations in various embodiments. Operations can be allocated for execution among one or more concurrently executing processes and/or threads.

In some embodiments, the network device can be configured with a plurality of readers to consume notifications. For example, one or more readers can run in each packet processor 112*a*-112*p*. Because the readers are only reading notifications from the notification queues and only reading data from the shared memory pointed at by the notification, each reader can run concurrently with and independently of other readers. The following description of operations can apply to each reader.

At operation 402, a reader (e.g., 216) can be triggered in response to detecting a signal from the writer informing the reader of a new notification (see operation 316 above). In accordance with the present disclosure, the reader can scan each of the priority notification queues to consume notifications in priority order. In accordance with some embodiments, the priority notification queues (e.g., 204, FIG. 2A) can be scanned in the following outer FOR loop. The outer loop can be iterated to scan the priority notification queue in order of their priority. For example, the highest priority priority notification queue (e.g., 204-*a*, FIG. 2B) can be scanned (processed) in the first iteration of the loop, the second highest priority priority notification queue 204-*b* can be scanned in the next iteration of the loop, and so on. For discussion purposes, the priority notification queue that is scanned in a given iteration of the outer FOR loop will be referred to as the "current priority notification queue." Processing can be deemed complete when each priority notification queue has been scanned, after which processing can continue with operation 416.

Outer Loop

Decision point 404—The reader can be configured to scan and consume notifications in every priority notification queue. In some embodiments, however, the reader may be configured to scan only certain priority notification queues. Accordingly, at decision point 404, if the reader is configured to scan the current priority notification queue, then processing can continue with the inner FOR loop. If the reader is not configured to scan the current priority notification queue, then processing can return to the top of the outer loop (via operation 414) to process the next priority notification queue.

As noted above, in some embodiments, entries in the priority notification queues contain pointers to entries in the main notification queue that store the actual notifications; as such the terms "pointer" and "notification" will be used interchangeably. Each notification in the current priority notification queue can be scanned in the following inner FOR loop. The notifications are scanned in sequential order from earliest notification to latest notification. The inner loop can begin with the earliest-in-time notification in the current priority notification queue. For discussion purposes, the notification that is consumed in a given iteration of the inner FOR loop will be referred to as the "current notification." Processing can be deemed complete when the reader has completed scanning the inner loop, after which processing can return to the top of the outer loop (via operation 414) to process the next priority notification queue.

Inner Loop

At decision point 406, if the current notification is tombstoned then the current notification can be deemed obsolete by virtue of a later notification that targets the same memory location in shared memory, as explained above at decision point 314. As such, processing can return to the top of the inner loop (via operation 412) to consume the next notification in the current priority notification queue. If the current notification is not tombstoned, the processing can proceed with operation 408.

At operation 408, the reader can consume the current notification. Recall that a notification comprises a pointer (e.g., 222) to the data (e.g., IP route) of interest. The reader can read out the IP route contained in the location in shared memory (e.g., 214) using the pointer contained in the current notification. The reader can signal or otherwise invoke one or more agents (e.g., 218) to consume the IP route; for example, the agent may program the IP route in a routing table.

At operation 410, the reader can update the time tracker (e.g., 210) associated with the current priority notification queue. As explained above, the time tracker represents the time of the most recently consumed notification in a given priority notification queue. With respect to the current priority notification queue, if the associated time tracker contains a timestamp that indicates a time earlier than the timestamp contained in the current notification, that can mean the current notification is the latest notification in the current priority notification queue to be consumed. Accordingly, the reader can update the time tracker associated with the current priority notification queue by copying the timestamp contained in the current notification into the time tracker. On the other hand, if the associated time tracker contains a timestamp that is later than the timestamp contained in the current notification, that can be deemed to indicate another reader has consumed a notification that occurs later in time than the current notification. Accordingly, the time tracker is not updated. Processing can return to the top of the inner loop (via operation 412) to consume the next notification in the current priority notification queue.

Processing can continue at operation 416 when the outer FOR loop has completed; in other words, when all the priority notification queues 204 have been scanned. Accordingly at operation 416, the reader can continue with the normal priority notifications. Details for consuming normal priority notifications in accordance with some embodiments are described in connection with FIG. 5. Upon completion of consuming the normal priority notifications, processing by the reader can be deemed complete. The reader can sleep until it is signaled again by the writer in response to a new notification.

The processing shown in FIG. 4 illustrates that, in some embodiments, queues are processed in order from high to low priority, and that each queue is scanned completely before scanning the next queue. It will be appreciated that in accordance with the present disclosure, the processing need not be in order from high to low priority, nor does the processing require that a queue be completely scanned before scanning the next queue. In some embodiments, the queue scanning order can be based on any suitable ordering criteria. For example, queue order can be based on a statistical criterion, where queues are associated with a weighted probability so that higher priority queues are likely to be consumed more often, and the normal priority queue will be consumed less often. This can avoid higher priority queues completely starving lower priority queues from being serviced. Queue order can be determined by the user (e.g., network administrator). Using the color-based tagging example described above, the user may specify that "blue" queues be processed, then "red," then "green." In addition, queues need not be scanned completely before moving on to the next queue. In some embodiments, for instance, the queues can be scanned in round-robin fashion, where one (or more) notification in each queue is processed for each round. In some cases, more notifications may be processed in higher priority queues than in lower queues per round, and so on. Again, this avoids any one queue from starving lower priority queues. Still other queue ordering criteria can be used to process queues in accordance with the present disclosure.

Figure 5:
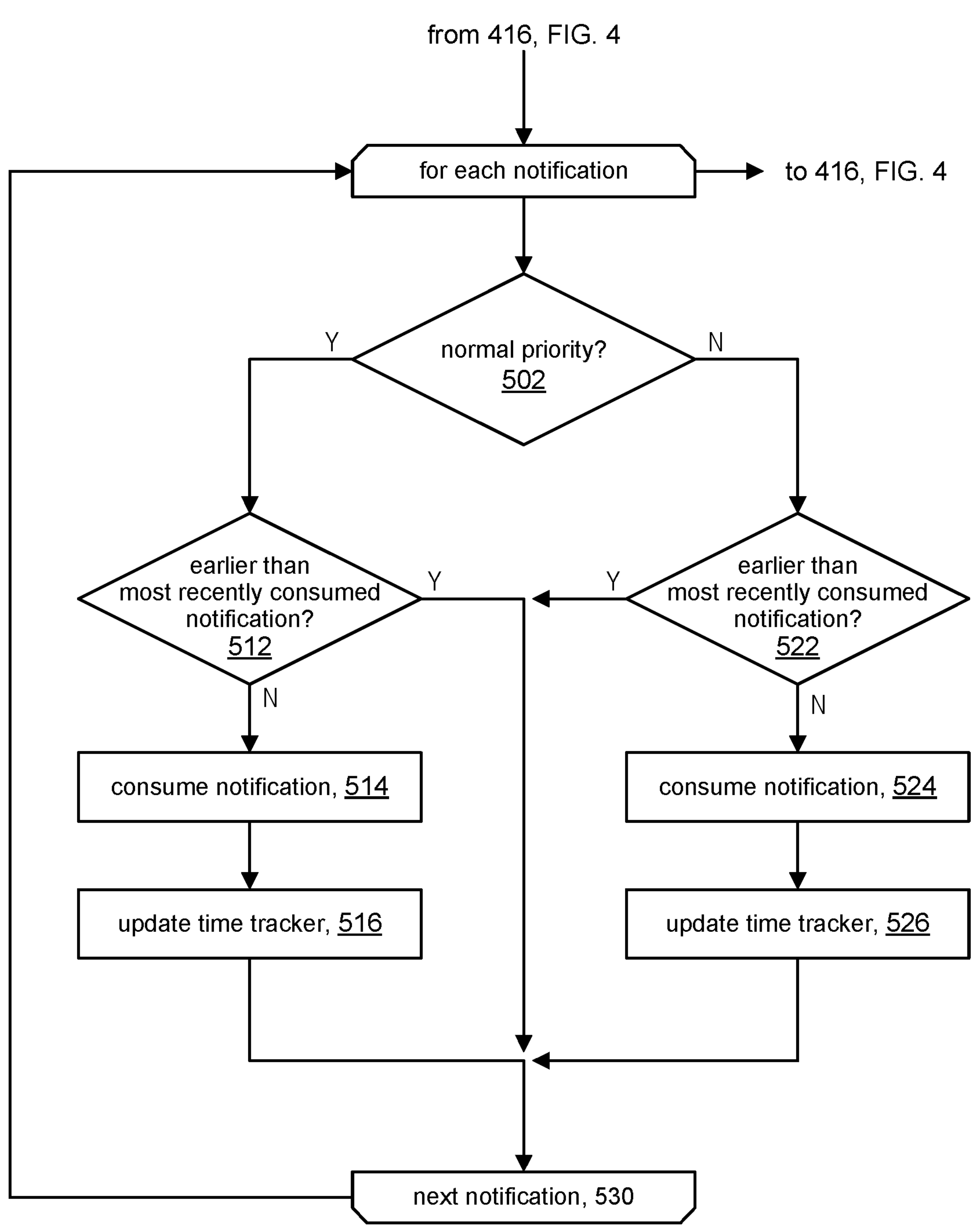

Referring to FIG. 5 and picking up from operation 416 above, at this point, the higher priority notification queues have been scanned and higher priority notifications have been consumed. The discussion will now turn to a high-level description of processing by the reader to consume normal priority notifications in accordance with the present disclosure.

In accordance with some embodiments, the normal priority notifications can be consumed from the main notification queue (e.g., 202) because higher priority notifications in the main notification queue will have been consumed in accordance with the processing of FIG. 4 for the most part. In accordance with some embodiments, the main notification queue can be scanned in the following FOR loop. The FOR loop can begin with the earliest-in-time notification in the main notification queue. For discussion purposes, the notification that is consumed in a given iteration of the FOR loop will be referred to as the "current notification."

At decision point 502, new high priority notifications can be inserted into the main notification queue subsequent to the reader scanning the priority notification queues. Accordingly, the reader may encounter high priority notifications when scanning the main notification queue. If the current notification is a normal priority notification, then processing can proceed to decision point 512. If the current notification is not a normal priority notification, then processing can proceed to decision point 522. In some embodiments, for example, the priority of the notification can be determined based on the priority (e.g., 226) component in the current notification.

At decision point 512, in response to a determination that the current notification is normal priority, the reader can determine if the current notification is earlier than the most recently consumed notification in the main notification queue. In some embodiments, time can be represented by a monotonically increasing sequence number (e.g., 228); a sequence number x that is less than a sequence number y is deemed to be earlier in time than y. Recall, when a given notification is added to the queue(s) (306 in FIG. 3), the sequence number is stored in its timestamp. When that notification is consumed, its timestamp is stored in the time tracker of the queue that contains/points to the notification (410 in FIG. 4, and 516 and 526 below). Accordingly, if the timestamp of the current notification is earlier than the time tracker associated with the main notification queue, then the current notification can be deemed to have been already consumed and processing can return to the top of the FOR loop (via operation 530) to consume the next notification in the main notification queue. If the timestamp of the current notification is later than the time tracker associated with the main notification queue, then the current notification can be deemed to be unconsumed and processing can proceed to operation 514.

At operation 514, the reader can consume the current notification. Recall that a notification comprises a pointer (e.g., 222) to the IP route stored in shared memory. The reader can read out the IP route from the shared memory using the pointer. The reader can signal or otherwise invoke one or more agents (e.g., 218) to consume the IP route; for example, by programming the IP route.

At operation 516, the reader can update the time tracker associated with the main notification queue by copying the timestamp contained in the current notification into the time tracker. Processing can return to the top of the FOR loop (via operation 530) to consume the next notification in the main notification queue.

At decision point 522, in response to a determination (at decision point 502) that the current notification is higher priority than normal priority, the reader can access the priority notification queue that corresponds to the priority of the current notification. The reader can determine if the current notification is earlier than the most recently consumed notification in the accessed priority notification queue. If the timestamp of the current notification is earlier than the time tracker associated with the accessed priority notification queue, then the current notification can be deemed have been already consumed and processing can return to the top of the FOR loop (via operation 530) to consume the next notification in the main notification queue. If the timestamp of the current notification is later than the time tracker associated with the accessed priority notification queue, then the current notification can be deemed to be unconsumed and processing can proceed to operation 524.

At operation 524, the reader can consume the current notification. For example, the reader can read out the IP route contained in the location in shared memory and signal or otherwise invoke one or more agents (e.g., 218) to consume the IP route; for example, by programming the IP route.

At operation 526, the reader can update the time tracker associated with the accessed priority notification queue by copying the timestamp contained in the current notification into the time tracker. Processing can return to the top of the FOR loop (via operation 530) to consume the next notification in the main notification queue.

Upon completion of the FOR loop, processing can return operation 416 in FIG. 4.

The discussion will now turn to additional processing by the writer when the main notification queue becomes full. Because any embodiment of the main notification queue is limited by a finite amount of memory, the main notification queue will eventually be deemed to be full, for example, when a new notification is inserted into the last entry of the queue.

Figure 6:
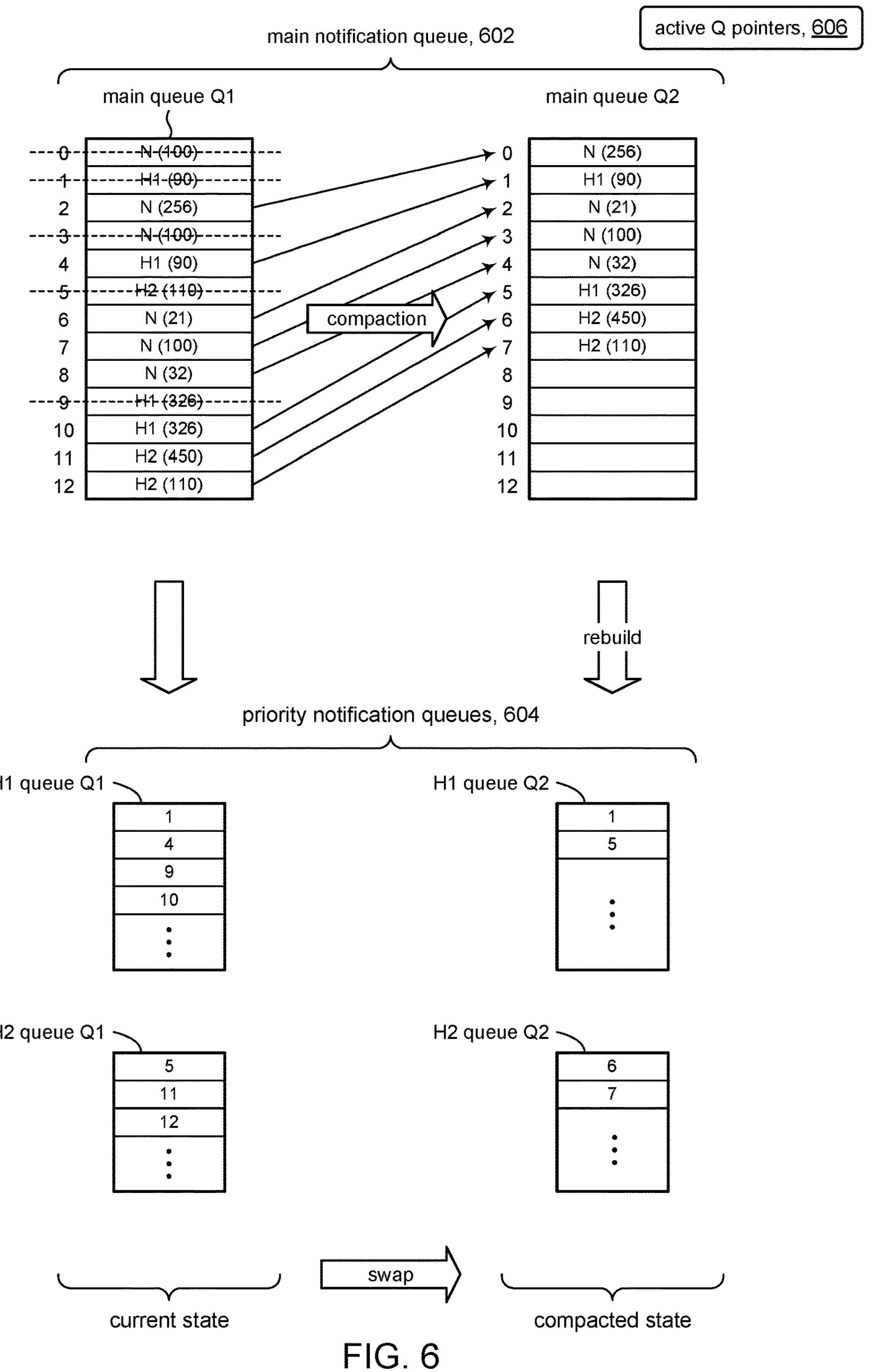
FIG. 6 illustrates queue compaction in accordance with the present disclosure.

Referring to FIG. 6, in some embodiments, the main notification queue 602 can comprise two components: main queue Q1 and main queue Q2. One queue (e.g., Q1) is designated the active queue (active mode) into which new notifications are inserted, and the other queue (e.g., Q2) is the standby queue (standby mode). Q1 and Q2 swap roles between active and standby. In some embodiments, active queue pointers 606 can include a suitable reference (e.g., pointer) to either Q1 or Q2, whichever is the active queue.

Likewise, each of the priority notification queues 604 can comprise two components as with the main notification queue 602. For example, the H1 priority notification queue can comprise an H1 priority queue Q1 and an H1 priority queue Q2. The two queues can switch roles between being the active queue and the standby queue; the active queue pointers 606 can include suitable references (e.g., pointers) to either the H1 priority queue Q1 or the H1 priority queue Q2, whichever is the active queue. Likewise, for other priority notification queues; e.g., the H2 priority notification queue comprises an H2 priority queue Q1 and an H2 priority queue Q2.

FIG. 6 shows a current state in which the main queue Q1, H1 priority queue Q1, and H2 priority queue Q1 are the active queues. Main queue Q1 shows some tombstoned notifications to illustrate an example of tombstoning. The notational convention used in the figure shows the notification as being normal priority level (N) or one of the high priority levels (H1, H2). The number in the parentheses represent the target memory locations in shared memory. For example, the notification at index 0 is a normal priority notification that targets memory location 100, the notification at index 1 is an H1 high priority notification that targets memory location 90, the notification at index 2 is another normal priority notification that targets memory location 256, and so on.

Some notifications in main queue Q1 are stricken to indicate tombstoned notifications. The example in FIG. 6 shows the following tombstoning occurrences:

- notification 0 (index 0) was tombstoned by notification 3 because notification 3 targets the same memory location as notification 0; notification 3 in turn was tombstoned by notification 7 for the same reason
- notification 1 was tombstoned by notification 4
- notification 5 was tombstoned by notification 12
- notification 9 was tombstoned by notification 10

H1 priority queue Q1 and H2 priority queue Q1 point to their respective notifications in main queue Q1, including the tombstoned notifications. As explained above, notifications in the H1 queue and the H2 queue that are tombstoned will be skipped over per decision point 406 in FIG. 4.

FIG. 6 shows that the active main queue Q1 is depicted as being full; the last entry (index 12) has a notification. In some embodiments, the writer can perform a compaction operation on the main notification queue in response to the main notification queue becoming full. In some embodiments, for example, the writer (or a suitable agent running on the network device) can perform compaction as follows, using the configuration shown in FIG. 6:

- Compaction—The writer can copy all the non-tombstoned notifications from the (active) main queue Q1 into the (standby) main queue Q2. In this example, the compaction recovers six entries from main queue Q1.
- Rebuild—The priority queues are rebuilt. In addition to copying non-tombstoned notifications to the main queue Q2, if the notification is a high priority notification, it is copied to the corresponding standby priority queue, H1 priority queue Q2, H2 priority queue Q2.
- Swap—The active Q pointers 606 can now point to the main queue Q2 as the active main queue and to the H1 priority queue Q2 and the H2 priority queue Q2 as the active priority queues.

As can be seen, the queue full condition represents an opportunity to perform compaction in order to remove tombstoned notifications and recover space in the active main notification queue. It will be appreciated that in some embodiments, compaction can be triggered by a near full condition (e.g., 90% full). In other embodiments, compaction can be triggered on a timed basis, and so on.

The above description illustrates various embodiments of the present disclosure along with examples of how aspects of the present disclosure may be implemented. The above examples and embodiments should not be deemed to be the only embodiments, and are presented to illustrate the flexibility and advantages of the present disclosure as defined by the following claims. Based on the above disclosure and the following claims, other arrangements, embodiments, implementations and equivalents may be employed without departing from the scope of the disclosure as defined by the claims.

The invention claimed is:

1. A method in a network device for notifying a plurality of readers running on the network device of data to be processed, the method comprising:

- receiving a plurality of data to be processed, each received data having a priority level among a plurality of priority levels including a normal priority level and one or more high priority levels;
- storing each received data in a slot among a plurality of slots in a shared memory;
- adding a corresponding notification for each received data into an entry in a main notification queue, the notification comprising a slot identifier of the slot that contains the received data and the priority level of the received data;
- in response to a notification referring to received data that is at one of the high priority levels, then storing a pointer to the entry in the main notification queue that contains the notification into one of a plurality of priority notification queues that corresponds to the high priority level of the received data, wherein the plurality of priority notification queues comprises at least a highest priority notification queue and at least a next highest priority notification queue; and
- signaling the plurality of readers for each notification that is added to the main notification queue,
- wherein each reader, in response to being signaled, scans the plurality of priority notification queues to consume one or more notifications in the main notification queue and scans the main notification queue to consume notifications that were not already consumed via one of the plurality of priority notification queues.

2. The method of claim 1, wherein each notification further includes a notification timestamp, wherein each priority notification queue is associated with a queue timestamp of a most recently consumed notification in that priority notification queue, wherein scanning the main notification queue includes:

- encountering a high priority level notification in the main notification queue; and
- consuming the high priority level notification when the notification timestamp thereof indicates it is later in time than the queue timestamp associated with the high priority notification queue corresponding to the high priority level notification.

3. The method of claim 2, wherein the notification timestamp is a sequence number that is incremented and included with each notification that is added to the main notification queue.

4. The method of claim 1, further comprising scanning the main notification queue subsequent to scanning the plurality of priority notification queues, including:

- first consuming any unconsumed high priority level notifications in the main notification queue; and
- subsequent to the first consuming, consuming normal priority level notifications.

5. The method of claim 1, further comprising the reader programming hardware in the network device based on data stored in a slot of the shared memory referenced in a consumed notification.

6. The method of claim 1, further comprising tombstoning an earlier notification in the main notification queue when a subsequent notification targets the same slot as the earlier notification.

7. The method of claim 6, further comprising compacting the main notification queue to remove tombstoned notifications in response to the main notification queue becoming full, including updating each of the plurality of priority notification queues with new pointers to the main notification queue.

8. The method of claim 1, further comprising each reader, scanning the plurality of priority notification queues in order from the highest priority notification queue to a lowest priority notification queue, followed by scanning the main notification queue to consume notifications in sequence from an earliest unconsumed notification.

9. A network device comprising:

a memory;

one or more computer processors; and a computer-readable storage device comprising instructions for controlling the one or more computer processors to:

receive data for processing, the data being associated with a priority level; and store a notification that references the received data into an entry in a main notification queue;

store a reference to the entry into one of a plurality of priority notification queues that corresponds to the priority level associated with the received data, wherein the plurality of priority notification queues comprises at least a highest priority notification queue and at least a next highest priority notification queue; and process the notifications stored in the main notification queue, including:

scanning the plurality of priority notification queues and, for each priority notification queue, consuming at least one notification by using a reference stored in the priority notification queue to access a corresponding notification stored in the main notification queue and processing the data in the corresponding notification; and scanning the main notification queue and consuming one or more notifications in the main notification queue that were not already consumed via one of the plurality of priority notification queues.

10. The network device of claim 9, wherein the plurality of priority notification queues are scanned in order of priority followed by scanning the main notification queue.

11. The network device of claim 9, wherein the computer-readable storage device further comprises instructions for controlling the one or more computer processors to store the received data to the memory, wherein the notifications include references to locations in the memory that contain the received data.

12. The network device of claim 9, wherein scanning the main notification queue includes, encountering a previously unconsumed notification referenced in one of the plurality of priority notification queues and consuming the previously unconsumed notification.

13. The network device of claim 9, wherein the computer-readable storage device further comprises instructions for controlling the one or more computer processors to tombstone an earlier notification in the main notification queue when a subsequent notification targets the same slot as the earlier notification.

14. The network device of claim 13, wherein the computer-readable storage device further comprises instructions for controlling the one or more computer processors to compact the main notification queue to remove tombstoned notifications in response to the main notification queue becoming full, including updating each of the plurality of priority notification queues with references to the compacted main notification queue.

15. A method in a network device comprising:

receiving data for processing, the data being associated with a priority level;

adding a notification of the received data to a main notification queue;

in response to the received data being associated with a priority level higher than a lowest priority level, then adding a pointer to the notification in the main notification queue to one of a plurality of priority notification queues that corresponds to the priority level of the data, wherein the plurality of priority notification queues comprises at least a highest priority notification queue and at least a next highest priority notification queue; and scanning the plurality of priority notification queues to consume one or more notifications in the main notification queue and the main notification queue to consume notifications that were not already consumed via one of the plurality of priority notification queues.

16. The method of claim 15, further comprising signaling one or more readers to scan the plurality of priority notification queues and the main notification queue.

17. The method of claim 15, wherein the one or more readers program hardware in the network device with the data referenced in the notifications.

18. The method of claim 15, wherein scanning the main notification queue includes, encountering a previously unconsumed high priority level notifications in the main notification queue and consuming the previously unconsumed high priority level notification.

19. The method of claim 15, further comprising tombstoning an earlier notification in the main notification queue when a subsequent notification targets the same slot as the earlier notification.

20. The method of claim 19, further comprising compacting the main notification queue to remove tombstoned notifications in response to the main notification queue becoming full, including updating each of the plurality of priority notification queues with new pointers to the main notification queue.

* * * * *